Figure 1:
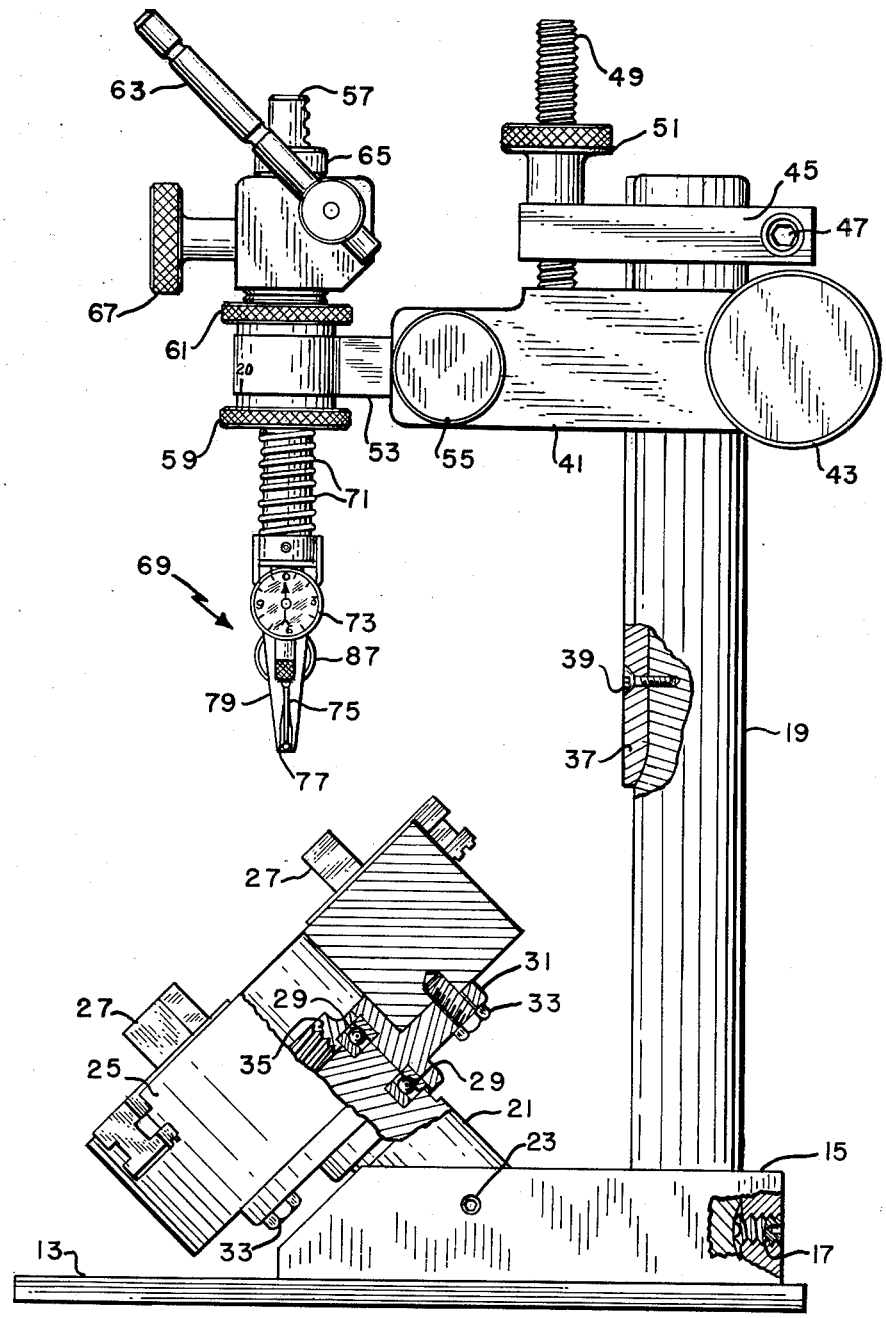

INVENTOR.
RUDOLPH VYNES 3,100,940
GEAR TOOTH GAUGING APPARATUS
Rudolph Vynes, Ogden, Utah, assignor to the United States of America as represented by the Secretary of the Air Force
Filed Aug. 21, 1959, Ser. No. 835,378
1 Claim. (Cl. 33—179.5)
(Granted under Title 35, U.S. Code (1952), sec. 266)

The invention described herein may be manufactured and used by or for the United States Government for governmental purposes without payment to me of any royalty thereon.

This invention relates to a device for checking by accurately measuring the relative dimensional changes of a series of gear teeth and more particularly is concerned with improved measuring apparatus for determining the change in chordal distance at selected tooth depths between adjacent gear teeth as compared to the spacing and thickness of standard gear teeth.

In order to correctly determine the serviceability of used gears, particularly those used in aircraft structures, it is necessary to determine, with extreme accuracy, the dimensions of the gear teeth as compared to a standard unused gear. Presently known methods of making this determination generally include some device for measuring the width of each gear tooth at some fixed depth usually along the pitch line. The resulting measurement will usually be sufficient to determine whether or not the gear tooth is worn beyond its serviceable limit. However, other factors influence the serviceability of a gear besides the wear of the gear teeth. For example, one or more teeth may become bent or displaced as a result of the application of stress loads higher than the elastic limit of the material used in forming the gears. Under these circumstances, the width of the teeth would probably still be within the allowable tolerances, yet the gear is not serviceable because the spacing of the teeth has been altered. Thus the conventional gear tooth checker would not ordinarily detect a deformity of this nature.

A gear tooth gauge according to my invention will detect bent or displaced teeth because displacement must necessarily alter the relative spacing of the gear teeth. By measuring the spacing between the teeth rather than the width of the teeth themselves, deformities can be detected and true serviceability can be determined. Normal wear as well will be evident on the indicator dial of my invention because this factor also affects the teeth spacing.

Accordingly, it is an object of my invention to provide a gauge for determining the condition of gear teeth by measuring the distance between the teeth and comparing this to a known standard.

Another object of the present invention is to provide a highly accurate measuring device for determining the serviceability of a gear. Improved accuracy is accomplished by connecting a gauging finger to a dial indicator and reading wear directly on the indicator.

Another object of the invention is to provide an improved gear checking device which can be operated by less experienced help than is normally necessary for making serviceability determinations. Simplified adjustments and controls make this feature possible.

Still another object of the invention is to provide improved gear measuring apparatus which does not require adapters to quickly and accurately check gears thereby reducing the average checking time by making the apparatus adaptable for checking any type gear when comparative readings between worn and unworn teeth is required.

Figure 2:
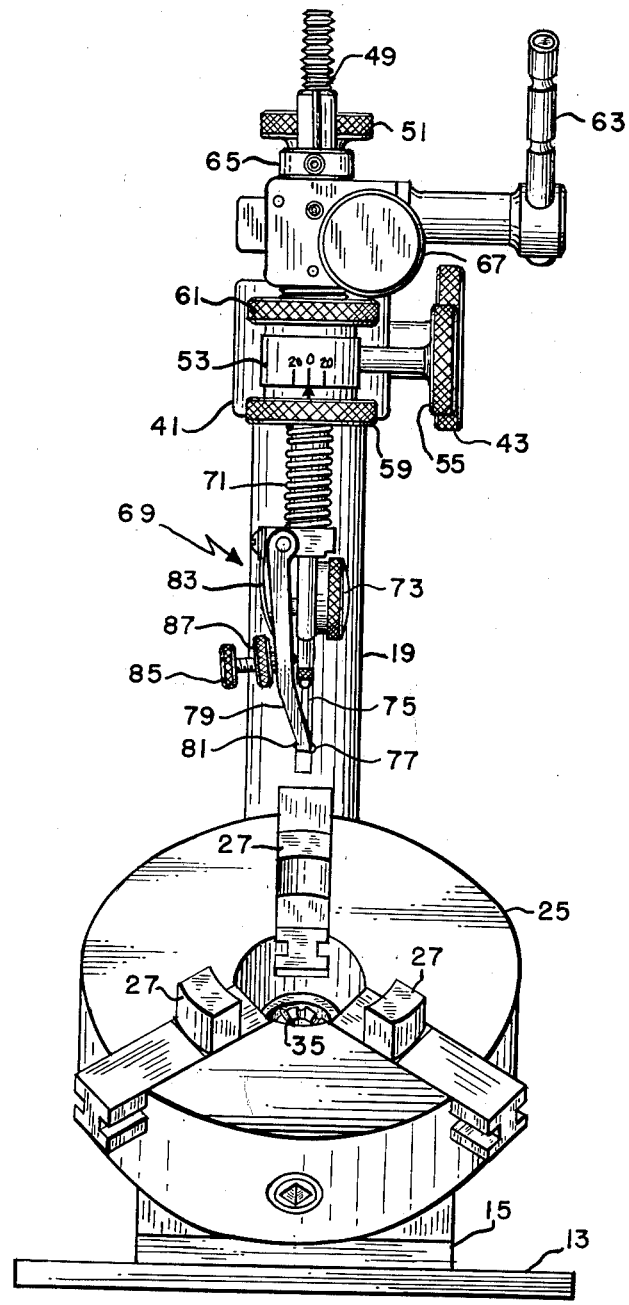
Figure 3:
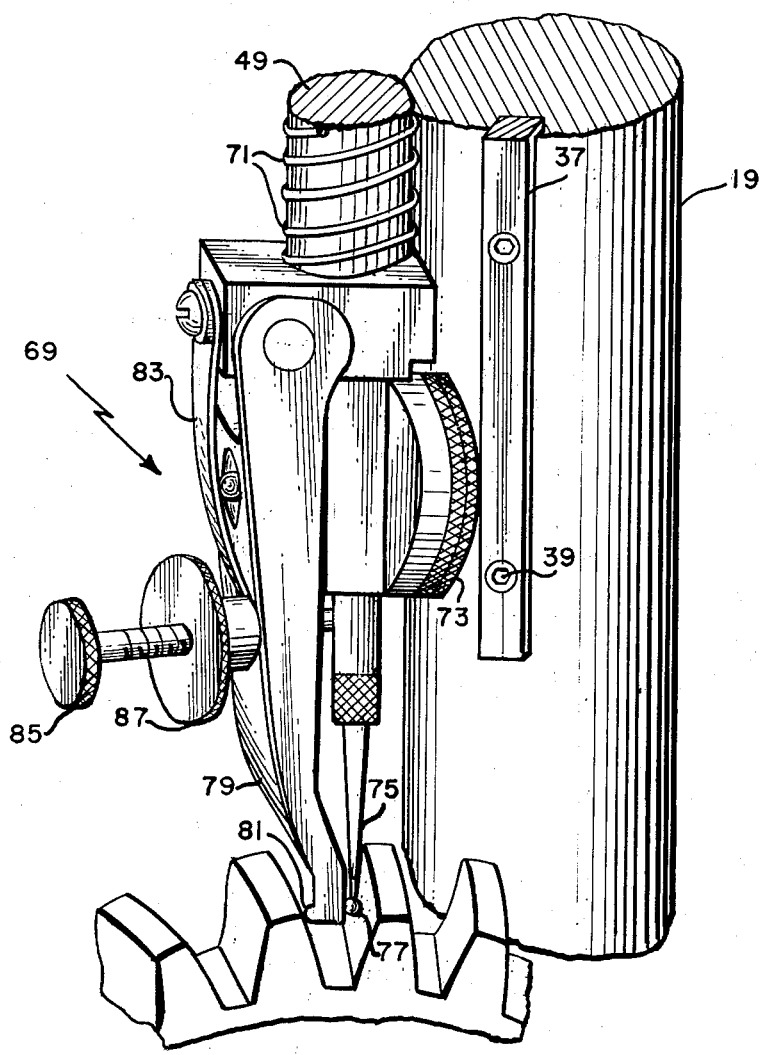

These and other objects, features, and advantages will become more apparent from the following description taken in conjunction with the accompanying drawings wherein:

FIG. 1 is a side elevation view of the apparatus;
FIG. 2 is a front elevation view of the apparatus; and
FIG. 3 is an enlarged detailed view of the indicator head in operation checking a gear.

Referring to the drawings, in FIG. 1 there is shown a side elevation view of the apparatus. A base plate 13 supports the base block 15 which is rigidly attached thereto. Attached to the base block 15 and locked in place by the set screw 17 is the main supporting column 19. Also attached to the base block 15 is a chuck mount arbor 21 held in position by the set screw 23.

A self centering chuck 25 having the jaws 27 is mounted on radial thrust ball bearings 29 which are pre-loaded to provide a very slight drag and remove all lash and play. The gear to be checked may be gripped either internally or externally depending upon the shape and type of gear. An adapter plate 31 is bolted to the chuck 25 by bolts 33 and serves to adapt the chuck 25 for rotating attachment to the arbor 21. A castellated nut 35 is used to hold chuck 25 in position on the arbor 21 so that its axial movement is restricted.

The upper portion of the main supporting column 19 is provided with a guide 37 held in place by the screw 39. A carriage 41 is disposed on the upper portion of the main supporting column 19. The guide 37 serves to prevent rotation of the carriage 41 by engaging a key slot (not shown) therein. A knurled knob 43 may be tightened to lock the carriage 41 in position and prevent further axial movement after it has been adjusted. Located above the carriage 41 is a top plate 45 which is permanently locked in place by the cap screw 47. A threaded stud 49 passes through a clearance hole in the top plate 45 and into the carriage 41. The upper threaded portion of the stud 49 has the knurled knob 51 engaging therewith. When the locking knob 43 of the carriage is in the unlocked position, raising and lowering may be accomplished by turning knurled knob 51 in one direction or the other. This feature serves to make upward or downward adjustment of the carriage 41 more simple and convenient as well as reducing the necessary effort and chance of error.

The front portion of the carriage 41 is apertured to receive a support member 53 which is held in place by a pressure applying knurled screw 55 and serves to support the indicator shaft 57. A hub 59 which has a threaded shank portion engaged by the nut 61 is held in contact with the support member 53. The indicator shaft 57 passes through hub 59 with a sliding fit. The hub 59 and indicator shaft 57 are keyed to each other so that there can be no relative rotational movement therebetween. Thus, after the indicator shaft 57 is set to the proper helix angle and the nut 61 of the hub 59 is tightened the shaft can be raised and lowered without danger of rotational movement.

The handle 63 is the control means for setting the indicator height. The upper portion of the indicator shaft 57 is provided with a stop ring 65 which is set to determine the limit to which the indicator shaft 57 can be lowered. A clamping knob 67 serves to retain the indicator shaft 57 in a predetermined vertical position relative to the gear being inspected. On the lower end of the indicator shaft 57 there is located the indicator head 69. A biasing spring 71 serves to urge the indicator head 69 downward in contact with the work. The primary element of the indicator head 69 is a dial indicator 73 which includes a pivotally mounted shaft 75 and a ball type contact 77. Any lateral movement of the shaft 75 produces a corresponding change in the reading on the dial of said indicator 73.

A pivotally attached finger member 79 having a ball contact 81 is urged toward the indicator 73 by the leaf spring 83. Adjusting screw 85 serves to set the position of the finger ball contact 81 and lock nut 87 holds the ball contact in a fixed position.

In order to check the amount of wear and determine the serviceability of a bevel gear such as an aircraft propeller gear, the fixture is set up in the following manner. It is first necessary to determine the zero reading by measuring a standard gear having unworn teeth. This reading is compared to readings obtained from used gear teeth and the condition of the gear is thereby determined.

First, the gear is mounted in the chuck 25 and gripped internally or externally by the chuck jaws 27. Only slight grip pressure or just enough to hold gear in place is preferable to prevent distortion or false indicator readings. Machined surfaces, preferably bearing race contact mounting surfaces, should be used to grip the gear on the chuck.

The next step includes setting the low limit of the indicator shaft 57. This is accomplished by setting the stop ring 65 so that the ball contacts 77 and 81 of the indicator 73 and finger member 79, respectively, contact the gear teeth on the pitch circle when the indicator shaft 57 is at its lowest position. The horizontal position of the indicator head 69 is set by loosening the knurled screw 55 and sliding shank member 53 forward or backward until the desired horizontal location on the gear tooth is reached. The knurled screw 55 is then tightened to lock the shaft member 53 from any further movement.

When the gear to be checked is a helical gear it is necessary to know the helix angle in degrees right or left. The indicator head 69 must be rotated to compensate for this angle. This is done by loosening knurled nut 61 and turning the knurled hub 59 until the desired helix angle is reached and then retightening the nut 61. The ball contacts are then properly oriented with respect to the teeth of the gear being checked.

With the indicator shaft 57 in the downward position against stop ring 65, further vertical adjustment, if necessary, can be acomplished by loosening knurled knob 43 and turning knurled knob 51 to the left to lower or to the right to raise the assembly. Tightening of knurled knob 43 locks the carriage 41 from any further movement. On worn gear teeth this height would be a maximum wear point which generally is about at the pitch circle of the gear. For new gear check in production this setting would be at the pitch circle using the master gear for setting up.

The finger member 79 is held against the unworn side of the gear tooth and a slight pressure is applied by rotating the chuck assembly 25. Loosening lock nut 87 and turning adjusting screw 85 serves to adjust the spacing between the ball contacts 77 and 81 and set the indicator at zero position. The zero setting is normally accomplished by using a gear having unworn teeth. In order to keep contact between the two gear tooth surfaces, the zero position of the indicator should be no less than .025 inch travel of indicator point to bring readings within range of plus or minus variation.

Although only certain embodiments of my invention have been shown and described herein it will be apparent to those skilled in the art that various changes may be made in the construction and relative shape and size of the elements without departing from the true spirit and scope of the appended claim.

What I claim is:

Apparatus for gauging gear teeth and the like comprising a base plate, a base block attached to said base plate, a main support column extending vertically upward from said base block, a carriage slidably attached to said main support column, said carriage having a horizontal opening in the forward end thereof, a shank member adapted to slide in the opening in said carriage, said shank member having a vertically oriented aperture in the forward portion thereof, a hub member juxtapositioned beneath said shank member and having a threaded extension passing through the vertically oriented aperture therein, said hub member being provided with an inside clearance hole, an indicator shaft dimensioned to slide vertically in the clearance hole in said hub member, a nut member engaging the threaded extension of said hub member above said shank member, the tightening of said nut member operating to lock said indicator shaft in a predetermined angular position, and measuring means attached to the lower end of said indicator shaft including a dial indicator having a contact arm extending therefrom to engage a first work surface, and a pivotally mounted finger member in lateral spaced relation to said contact arm for engaging a corresponding second work surface, the reading on said dial indicator being the distance between said first and second work surfaces.

References Cited in the file of this patent

UNITED STATES PATENTS

| | | |
|---|---|---|
| 1,539,896 | Claybourn | June 2, 1925 |
| 2,069,043 | Miller | Jan. 26, 1937 |
| 2,322,951 | Menzer | June 29, 1943 |
| 2,354,137 | Nystrom | July 18, 1944 |
| 2,381,975 | Ernst | Aug. 14, 1945 |
| 2,637,908 | Hedman | May 12, 1953 |

FOREIGN PATENTS

| | | |
|---|---|---|
| 418,780 | Great Britain | Oct. 31, 1934 |
| 552,589 | Great Britain | Apr. 15, 1943 |
| 859,678 | Germany | Dec. 15, 1952 |
| 49,337 | Sweden | Nov. 19, 1919 |